July 27, 1965   C. VAN DER LELY ETAL   3,197,084
DEVICE FOR SPREADING GRANULAR OR POWDERY MATERIAL
Original Filed Jan. 26, 1959
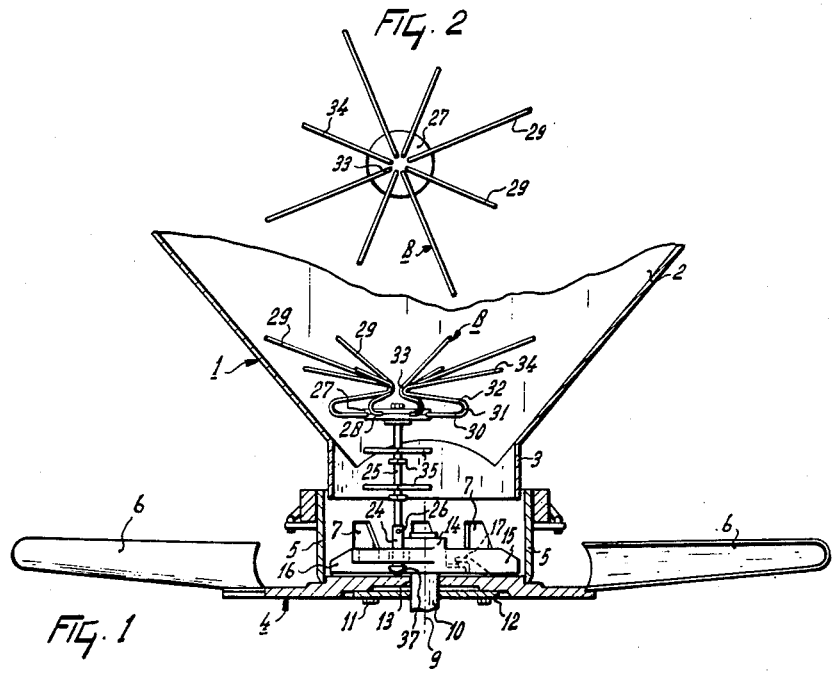
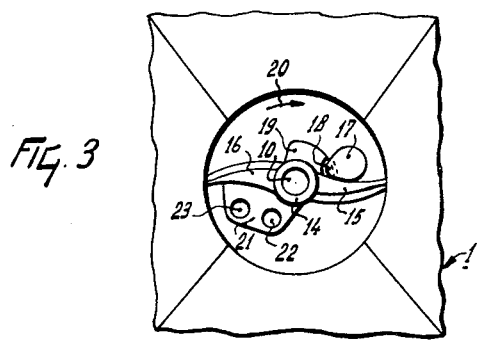
INVENTORS
CORNELIS & ARY VAN DER LELY
BY
Mason, Mason & Albright
Attorneys

United States Patent Office 3,197,084
Patented July 27, 1965

3,197,084
DEVICE FOR SPREADING GRANULAR OR POWDERY MATERIAL
Cornelis van der Lely, Zug, Switzerland, and Ary van der Lely, Maasland, Netherlands, assignors to C. van der Lely N.V., Maasland, Netherlands, a company of the Netherlands
Original application Jan. 26, 1959, Ser. No. 788,884, now Patent No. 3,038,643, dated June 12, 1962. Divided and this application May 31, 1962, Ser. No. 199,021
10 Claims. (Cl. 222—254)

This application is a division application of application Serial No. 788,884, now Patent No. 3,038,643, and relates to a device for spreading granular or powdery material, comprising a material container from which the material to be spread is delivered, which container has an outlet port and in which container an agitating member is arranged serving to ensure a proper delivery of the material from the container.

In accordance with the invention the agitating member has at least one extension made from one piece of material and being driven for movement relative to the container wall during operation by a driving mechanism, wherein the extension has at least two portions, as seen from above, extending radially or substantially radially to the central portion of the agitating member, at least one of the inner ends of the portions being coupled to the said central portion and the inner end of each portion lying nearer to the said central portion than the outer end of the other portion.

With the construction of the agitating member in accordance with the invention the agitating member can be made in a simple way and there can be obtained an effective delivery from the container of many kinds of material to be spread.

The invention will be described more fully with reference to an advantageous embodiment.

FIG. 1 is a sectional view of a container of a device in accordance with the invention, comprising an agitating member, FIG. 2 is a plan view of the top end of the member in the device shown in FIG. 1.

FIG. 3 is a plan view of a detail of the connection of the agitating member to a rotatable disc shown in FIG. 1.

The device according to FIGURES 1, 2 and 3 comprises a container 1 with a pyramid-shaped portion 2 and a cylindrical portion 3. Underneath the container 1 is arranged a moving mechanism having a disc 4, which is provided with spreading arms 6 which extend outside the container beyond the disc constituting partly the bottom of the container. Between the mechanism and the lower side 3 of the container an annulus 5 is arranged, which bears on the disc 4, while the top end of this annulus fits around the lower end 3 of the container 1. The annulus 5 is provided with outlet ports 7 through which the material is supplied from the container to the disc 4 and the spreading arms 6. The mechanism 4 is connected with a plate 12 by means of bolts 11, this plate being welded to a shaft 10 driven by a driving mechanism of a motor or by the running wheels supporting the device. In order to ensure a proper delivery of the material from the container 1, an agitating member 8 is provided in the container. This agitating member is connected to the disc 4 by a connecting means. The disc 4 is rotatable around the axis 9.

So as to connect the agitating member 8 to the disc 4, the latter disc has a shaft 10, the center line of which coincides with the axis of rotation 9. The top end of the shaft 10 which is taken through a hole 13 in the disc 4, is surrounded by the bearing 14 which is provided with two blade-shaped members 15 and 16, which are located opposite each other around the bearing. In order to secure the bearing 14 with the blades 15 and 16 against displacement about the shaft 10, provision is made of a lug 17 on the disc 4. The lug 17 has a portion 18 which occupies a higher position than the disc 4. Below this portion can be slipped a plane portion 19 of the bearing 14, so that the bearing 14 cannot be detached from the shaft 10.

When the mechanism 4 moves about the rotary shaft 9, it will rotate in a direction indicated by the arrow 20. Thus the lug 17 which is located over the portion 19 will be urged against the blade 15 which thus with the blade 16 and the bearing 14 will rotate with the disc 4 around the axis 9.

In order to connect the agitating member 8 with the moving mechanism 4, the blade 16 is provided on the rear side with a portion 21 having two holes 22 and 23, of which the hole 23 is farther remote from the axis 9 than the hole 22. The lower side of the member 8 is connected with the portion 21 of the blade 16 by taking a hollow pin 24 from the lower side through the hole 22 or the hole 23, in this embodiment the hole 22. The lower end of a rod 25 of the member 8 being introduced into the cavity of the pin 24 is secured against removal from this pin by means of a stud 26. Since the diameter of the pin 24 is smaller than the diameter of the hole 22, the member 8 of this embodiment is capable of rotating about a vertical axis of rotation which is parallel to the axis 9 with respect to the mechanism 4, while owing to the clearance of the pin 24 in the hole 22, the member 8 is capable of pivoting about horizontal axes which are parallel to a plane perpendicular to the axis 9 and at an angle of 90° to each other with respect to the mechanism 4. The blades 15 and 16 with the portion 21 together with the bearing 14 constitute in this case a connecting means of the agitating member by which the latter can be linked to the mechanism 4.

The agitating member 8 comprises the vertical upward rod 25 which is provided at the top end with two discs 27 and 28. Between the discs 27 and 28 are clamped ends of a plurality of extensions 29. The extensions 29 are made pairwise from one piece of resilient material, the coupling portion for two extensions lying between the discs 27 and 28. One of the two extensions is shorter than the other, so that provision is made of a plurality of long extensions 29 and a plurality of short extensions 29. Thus the line going through the free ends of the extensions 29 forms a figure which is identical to the circumference of the container at the level of these extensions. Each extension 29 has three radially orientated portions, which lie near each other and are connected with each other by a bend. An extension 29 has a first straight portion 30 extending radially from the central portion formed by the plates 27 and 28 which portion occupies a horizontal position in the vertical position of the rod 25. After the straight first portion 30 the extension goes over via a hairpin bend 31 into a slightly upwardly orientated, straight second portion 32, which is located together with the first portion 31 parallel to a plane comprising the centre line 25A of the rod 25. After the straight second portion 32 an extension goes over via a second hairpin bend 33 into a rising third straight portion 34, which occupies a higher position than the portion 30 and is at an angle to the portion 30 of about 15° or more. The portion 34 is located in such a way that its center line lies in the same vertical plane as the center lines of the portions 30 and 32, which plane also comprises the center line 25A of the rod 25. The portion 30, 32 and 34 lie hereby one above the other. The portion 34 of one extension is longer than the portion 34 of a neighbouring extension. The extensions 29 are shaped in a form such that the hairpin bends 33 of these extensions are located near one another.

When the member moves, the extensions 29 which are made from resilient material are capable of vibrating and moving resiliently relative to the rod 25. During this vibration of the extensions 29, the hairpin bends 33 of these extensions come into contact with one another, so that the extensions 29 will set each other vibrating. If one of the extensions 29 vibrates more violently than the other, this stronger vibration will be transferred to the other extensions, which is conductive to the looseness of the material. The extensions 29 each are shaped in a form such that each portion 30, 32 and 34 has one end near the central portion of the agitating member, from which central portion they extend each, as seen from above, radially in the container. The portions 30 and 32 are coupled to each other by the bend 31 with their outer ends, whereas the portions 32 and 34 are coupled with each other by the bend 33 with their inner ends lying near the central portion of the agitating member. Hereby each of the inner ends of the portions 30, 32, and 34 respectively, lies nearer the central portion of the agitating member than the outer ends of the other portions.

Underneath the extensions 29 the agitator 8 is provided with a plurality of side arms 35 which are shorter and, owing to their shape, more rigid than the extension 29. Two arms 35, viewed from above, are at angles to each other and may be of different lengths. Owing to the fact that the extensions 29 are made from one piece of material which is bent many times, several radially extending portions are constituted for which only one connecting element is needed.

Upon rotation of the mechanism 4, the agitator 8 will be pivotable relative to the mechanism 4. This movement may be effected favourably by the fact that the agitating member is coupled to the mechanism 4 with the lower end of the rod 25 arranged eccentrically with respect to the axis 9. The member 8 is secured against displacement from the hole 22 by prociding the pin 24 at the lower end with a head 37 which has a diameter exceeding that of the hole 22.

Since the portion 21 is arranged over the disc 4 only to an extent such that the head 37 has only a small amount of play between the mechanism 4 and the portion 21, the member 8 will not be capable of moving in an upward direction. The clearance space between the head 37 and the portion 21 and the member 4 is, however, so large that the swinging motions of the member 8 with the arms 29 and 35 to prevent caking of the material in the container are still permitted.

The advantage of a connection of the member 8 with the mechanism by means of a small part such as the pin 24 is that the pin 24 which may sometimes be subjected to greater wear than the member 8, can be exchanged readily. It is also possible to make the pin 24 from a material of greater resistance to wear, for example, a synthetic substance, than the material of the member 8 itself.

Although in this embodiment the side extensions 29 are curved twice, they may be curved only once, the second straight portion 32 then may extend beyond the central arm 25, viewed from the bend 31. It is then possible to form a bend 31 not only through 180° but even through an angle of 360° or more.

Although in the said embodiment the mechanism 4 rotates, the agitating member preventing caking of the material in the container may, as an alternative, be used with a mechanism performing not a rotation but a rocking movement.

What we claim is:

1. A device for spreading material comprising a material container with an outlet part and an agitator member arranged within said container to insure delivery of material from said container, a driving mechanism for moving said member relative to the inner wall of said container, said member having a shaft extending upwardly in said container, at least one extension being coupled to said shaft, said extension having portions projecting laterally with respect to said shaft, one of said portions being positioned below a second portion, a third portion being positioned above said second portion, said third portion having a free end extending towards said inner wall, said portions being coupled with bends and comprising a single piece of material.

2. The device of claim 1 wherein the first mentioned portion extends at least substantially perpendicular relative to said shaft and the second portion makes an angle of at least about 15° with said first mentioned portion.

3. The device of claim 1 wherein the extension is secured adjacent the top end of said shaft.

4. The device of claim 1 wherein the lower part of the shaft is provided with short rigid extensions in the form of side arms one lying over the other.

5. A device as claimed in claim 1, wherein the first mentioned portion is camped between two plates mounted on said shaft.

6. A device as claimed in claim 1, wherein there are a plurality of extensions having bends located near one another.

7. A device as claimed in claim 1, wherein the said portions are located substantially parallel to the same plane.

8. A device as claimed in claim 1, wherein the agitating member is coupled piviotably to the mechanism.

9. A device as claimed in claim 1, wherein there are a plurality of extensions and the bends coupling the second and third portions are located adjacent one another, said extensions being made from resilient material.

10. A device as claimed in claim 9, wherein the third portions of at least two extensions have different lengths.

References Cited by the Examiner

UNITED STATES PATENTS

| | | | |
|---|---|---|---|
| 427,963 | 5/90 | Booz et al. | 259—144 X |
| 1,730,784 | 10/29 | Rogginger | 222—228 X |
| 2,368,127 | 1/45 | Fasick | 22—232 |
| 2,685,388 | 8/54 | Steiner | 222—234 X |
| 2,691,468 | 10/54 | Guyer | 222—406 |
| 3,038,643 | 6/62 | Van der Lely et al. | 222—227 |

FOREIGN PATENTS 9,543    11/08    France.

RAPHAEL M. LUPO, Primary Examiner.

LOUIS J. DEMBO, Examiner.